April 16, 1957 T. C. FARRELL Re. 24,302

ROTOR VANE CONTROL

Original Filed Sept. 24, 1951 2 Sheets-Sheet 1

INVENTOR
THOMAS C. FARRELL

BY Strauch, Nolan & Diggins
ATTORNEYS

April 16, 1957 T. C. FARRELL Re. 24,302

ROTOR VANE CONTROL

Original Filed Sept. 24, 1951 2 Sheets-Sheet 2

INVENTOR
THOMAS C. FARRELL

BY Strauch, Nolan & Diggins

ATTORNEYS

United States Patent Office

Re. 24,302
Reissued Apr. 16, 1957

24,302

ROTOR VANE CONTROL

Thomas C. Farrell, Pittsburgh, Pa., assignor to Rockwell Manufacturing Company, Pittsburgh, Pa., a corporation of Pennsylvania Original No. 2,694,983, dated November 23, 1954, Serial No. 247,980, September 24, 1951. Application for reissue December 29, 1955, Serial No. 556,381

5 Claims. (Cl. 103—143)

Matter enclosed in heavy brackets [ ] appears in the original patent but forms no part of this reissue specification; matter printed in italics indicates the additions made by reissue.

This invention relates to improvements in rotary fluid meters, motors, pumps and the like and more particularly to those of the positive displacement type.

Rotary fluid meters and like devices of the postive displacement type take various forms, but one of the most satisfactory is that disclosed in the U. S. Patent No. 2,274,206 to W. H. Marsh, issued February 24, 1942, and it is toward devices of this type that the instant invention is particularly directed.

In devices of this type there is provided a casing having a measuring chamber within which a rotor is journalled, the rotor having a plurality of peripheral pockets or recesses in which vanes are positioned that rotate with the rotor, but are so controlled that they always face in the same direction. The vanes are generally or semi-cylindrical form and journalled for movement upon their own axes with respect to the rotor. Generally the diameter of each of the semi-cylindrical vanes is such that in its extended position it provides a running clearance with the cylindrical wall of the measuring chamber and also with a wall of semi-cylindrical recess in the periphery of the rotor. The length of the vanes is such that each provides a similar running clearance with the flat ends of the measuring chamber.

According to prior conventional commercial construction, the vanes are controllably rotated by a planetary gear construction involving a central fixed or sun gear, rotating or planet gears secured one to each vane to rotate therewith, and idler gears to mesh with both the sun gears and the planet gears. The gear ratios are such that the vanes maintain the same position relative to the rotor during each complete revolution of the rotor which is rotated by the fluid passing through the meter or the like in conventional manner.

In accord with the instant invention the relatively expensive planetary gear transmission system has been replaced with a unique and highly effective simplified construction wherein each vane is continuously positioned by means of a crank having one end affixed to the vane and the other end pivotally connected to a rotating control plate having an axis of rotation offset from the axis of rotation of the meter rotor, the eccentricity of the control plate, and the length of the crank arms being such that the vanes will always face in the same direction during the rotation of the rotor about its axis under the influence of the fluid passing through the meter.

Although certain disadvantages of the gear controlled system typified by the above-mentioned Marsh patent have long been recognized and prior attempts have been made to devise a commercially practical control system of the general type disclosed herein, insofar as is known no effective solution to this problem has been devised prior to the present invention.

Prior devices of this type have been uniformly characterized by high friction losses and by lack of dependability in operation which prevented their adoption by the industry. For the most part the prior developments have been as noteworthy in the problems they posed as in the teaching they offered.

Among the benefits of the improved assembly disclosed herein is a lower cost, resulting from the novel and highly efficient utilization of one control plate and vane control arms, which eliminates the need of the planetary gears, idler gears, idler gear posts, and the sun gear, and expensive assembly operations which are particularly high for planetary gearing because of the parallel axis arrangements required. Longer meter life and higher operating speeds result from the use of close fitting sleeve bearings in the control mechanism, which limit the amount of vane oscillation to a maximum of about 0.010 inch while the prior systems permit an oscillation of as much as 0.0625 inch measured on a radius of one inch. Large particles of abrasive cannot enter the close fitting sleeve bearings, and the rate of wear of the meter components is thus greatly reduced. With close fits and a lower rate of wear, the meter can run for a greater length of time before enough wear accumulates to permit a vane to tip and strike the division plate. Less oscillation of vanes results in less vibration and lower loads on the control bearing than in prior apparatus, and consequently the meter can be operated safely at higher speeds.

It is therefore a primary object of the present invention to provide a new and improved meter, motor, pump or the like having novel mechanism for positioning the vanes during rotation of the rotor.

Another important object of the invention is the novel utilization of a rotating control plate and control arms connecting it to the vanes for maintaining the vanes facing in one direction during rotation of the rotor.

Further objects of the invention are to provide a novel structure to lower the cost of the meter or the like, to give more silent operation, and to permit higher operating speeds while giving longer life.

Other objects will appear as the description proceeds in connection with the accompanying drawings, wherein.

Figure 1:
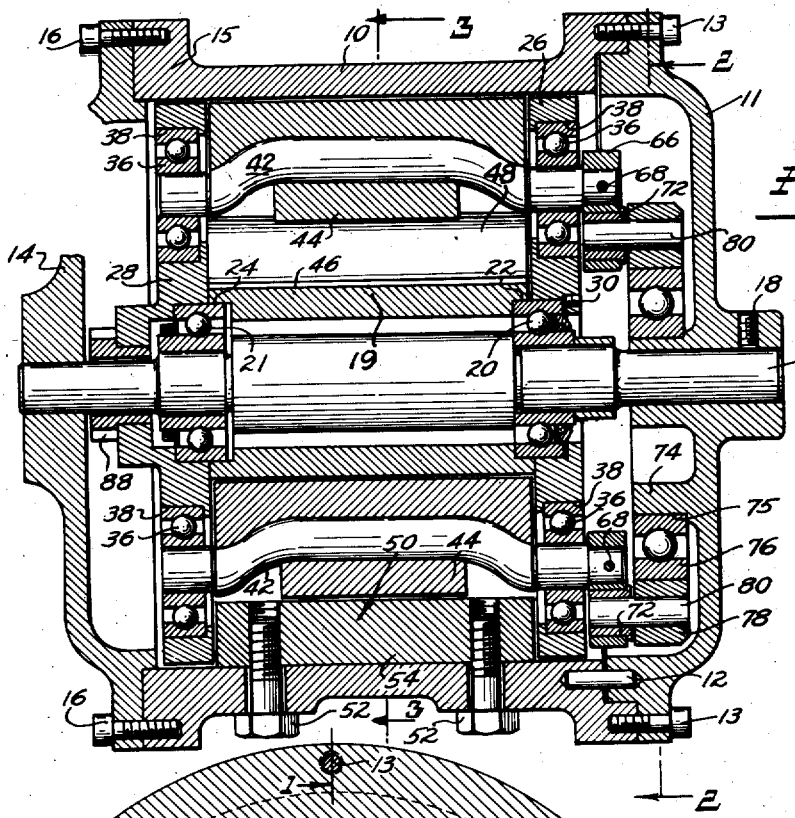
Figure 1 is a vertical sectional view through the axis of a meter according to a preferred embodiment of the present invention.

Referring to the drawings, in Figure 1 the meter body comprises a hollow cylindrical measuring chamber housing designated by the reference number 10. One end of the housing is closed by a closure 11 aligned as by one or more dowels 12 and fixedly secured as by a series of cap screws 13. The closure 14 for the other end of the housing 10 may be located and secured to the flange 15 in a similar manner by dowels (not shown) and cap screws 16.

A main shaft 17 is mounted axially within the measuring chamber housing 19 and fixedly secured within bores in the end closures 11 and 14 as by set screws, one of which is shown at 18.

Figure 3:
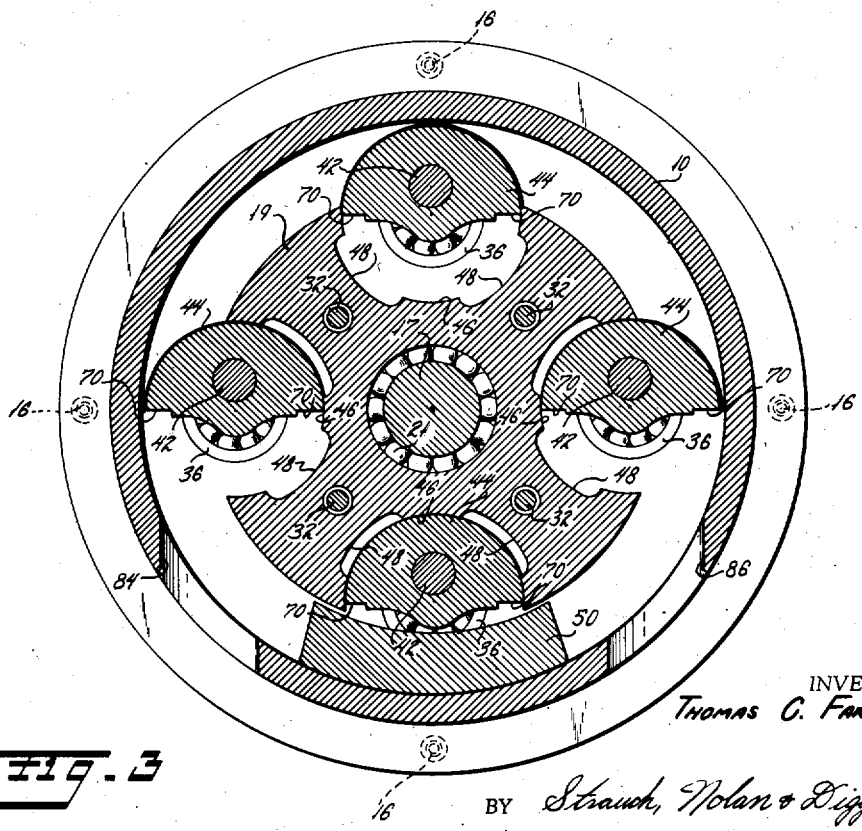
Figure 3 is a sectional view taken along line 3—3 of Figure 1 illustrating details of the rotor and vane construction.

A cylindrical rotor, indicated at 19 and shown in Figure 3, is rotatably mounted on main shaft 17 by a pair of spaced ball bearing assemblies 20 and 21, the outer races of which are press fitted into annular recesses 22 and 24 respectively formed in the opposite ends of the rotor 19. Also mounted on the bearing assemblies 20 and 21, respectively, are circular end plates 26 and 28 which have close peripheral running fit with the cylindrical inner surface of housing 10. The clearances here and throughout the drawings have been deliverately exaggerated for clarity of illustration. The bearing assemblies 20 and 21 may be held in place by set screws 30 (one shown).

Figure 4:
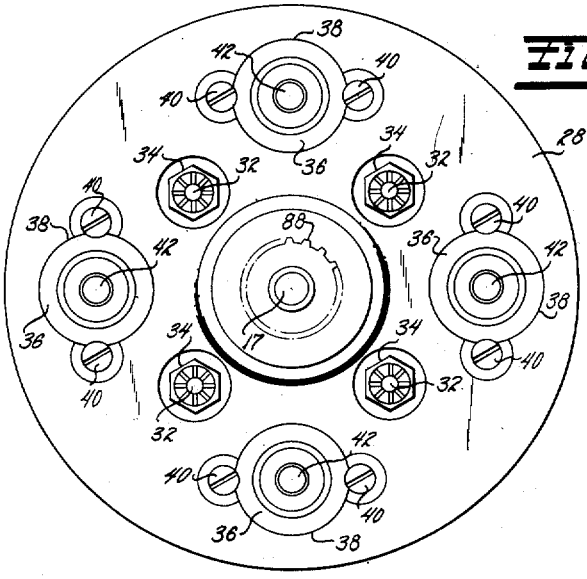
Figure 4 is an end view of the rotor and end plate assembly of the meter of Figure 1.

End plates 26 and 28 are rigidly secured to the rotor by means of four bolts 32 (Figure 4) which extend through the rotor body and the plates and are held in place by nuts 34. Each of the end plates carries four identical bearing assemblies 36 in shouldered apertures 38 spaced at 90° along a common circumferential line. As shown in Figure 4, each of the bearing assemblies may be held in place by two screws 40 in the respective plates, the heads of the screws extending over the outer races of the bearing assemblies.

Rotatably supported in the bearing assemblies 36 are the opposite ends of vane shafts 42 on which semi-circular vanes 44 may be separately secured or integrally formed. As best shown in Figure 3, vanes 44 are preferably of one-piece construction, preferably of aluminum or other light metal cast about shaft 42. It will be noted that the central portion of each shaft 42 is eccentric with respect to its axis of rotation to increase the strength of the bond between the shaft and the vane when a die cast structure is used.

The vanes are so dimensioned that when fully extended, as shown by the vane positioned at the top in Figure 3, they move with a close rotating fit within the housing 10 and when they occupy the diametrically opposed position they are received with a similar fit in longitudinal recesses 46 wholly within the rotor body. To decrease the area of frictional engagement between the vanes and the rotor body, the recesses are provided with additional longitudinal pockets 48 of sufficient depth so that the vanes may pass freely over them with a substantial clearance.

In accord with conventional practice, a suitable division plate assembly indicated generally at 50 is secured in the housing 10 at the bottom thereof between plates 26 and 28 as by cap screws 52.

Figure 2:
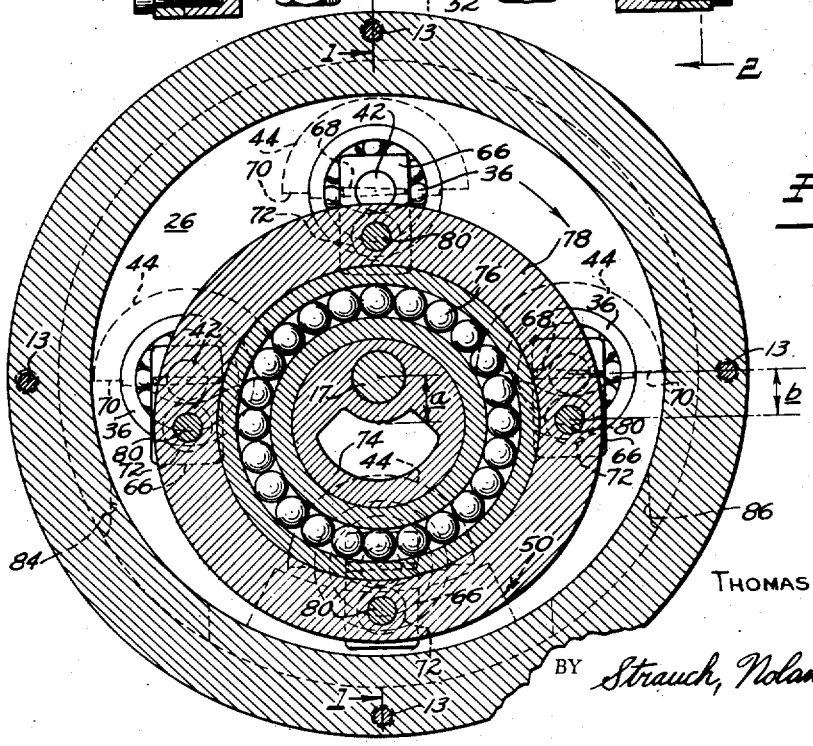
Figure 2 is a transverse sectional view taken along line 2—2 of Figure 1.

The improved mechanism for operating the vanes which forms an important part of the present invention will now be described with particular reference to Figures 1 and 2. As there shown, each of the vane shafts protrudes at one end through the bearing assembly 36 and a control arm or crank 66 is rigidly secured thereto as by a tapered pin 68 in such position that it is perpendicular to the parallel faces 70 of the respective rotor vanes. Each control or crank arm 66 has a bore therethrough below and parallel to its vane shaft in which bore is secured a hollow cylindrical friction reducing bushing 72.

The end closure plate 11 has an internal boss 74, the outer periphery of which is a cylindrical surface 75 eccentric with respect to the axis of shaft 17. A ball bearing assembly 76 has its inner race press fitted tightly over surface 75. A ring shaped control plate 78 is press fitted tightly onto the outer race of the bearing assembly 76 and has laterally protruding at right angles therefrom a series of pins 80, preferably fixed therein as by spot welds, extending parallel to the rotor shaft 17 and having a close rotating fit within the bores of the cylindrical bushings 72. Pins 80 are thus arranged with axes eccentric to shaft 17. The control plate 78 rotates about an axis vertically spaced the same distance a from the axis of rotation of rotor 19 as the vertical spacing b of the axis of pins 80 from the axes of the respective vane shafts 42. All of these axes are parallel.

In operation, fluid is supplied to the meter through inlet opening 84 and will move clockwise around the metering chamber toward the outlet 86. As the fluid enters the meter it will impinge upon a lower surface of the first vane assembly, rotating the entire rotor and vane assembly in a clockwise direction as viewed in Figures 2 and 3. Due to the connections between the rotor vanes and the crank arms 66 and the control plate 78, the latter will be rotated at the same speed as rotor 19. Since, as mentioned above, the eccentricity of the control plate 78 is exactly equal to the distance between the centers of shafts 80 and the axis of rotation of shafts 42, the cranks 66 remain vertical and parallel and vanes 44 will be always held in their initial downwardly facing positions throughout rotation of the rotor 19. Further, since the spaces between the extended vanes, the rotor and the casing are substantially sealed chambers, the quantity of fluid expelled in each quarter revolution of the rotor assembly will be constant and thus the number of rotations of the rotor gives the desired indication of the quantity of fluid passing through the meter. The number of rotations of the rotor 19 may be counted by any suitable register (not shown) driven from the rotor as by a gear 88 mounted on shaft 17 for rotation therewith.

From the foregoing it will be apparent that the novel meter herein disclosed is characterized by low friction losses, silent operation and extended useful life.

It will be noted that the number of rotating parts have been substantially reduced and that all of the rotating components are ball bearing supported.

Further, all of the movable components are of minimum size and weight to assure accuracy under low flow conditions and immediate responsiveness to variations in flow.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid handling device of the positive displacement type comprising a body made up of a housing having an inner cylindrical surface therein and opposed rigid end members, a stationary arbor mounted in said end members concentric with said cylindrical surface, a rotor rotatably mounted on said arbor and having an outer cylindrical surface concentric with the inner cylindrical surface of said housing to form an annular fluid displacement chamber, spaced end members fixedly mounted on said rotor having a running clearance with the body to close the ends of said displacement chamber, a division plate mounted in said chamber on the inner cylindrical surface of said housing and having a running clearance with said rotor and said spaced rotor end members, means providing fluid inlet and outlet connections in said chamber adjacent opposite sides of said division plate, means connected to the rotor whereby the rotor may be connected to another device adapted to turn with the rotor, a plurality of longitudinal surface pockets in said rotor extending between said end members, a vane shaft for each surface pocket projecting *rotatably* through one of said rotor end members, a cylindrically shaped vane having a cut-out portion *fixedly* [rotatably] mounted on each of said vane shafts to extend into said pockets, means for rotating the vanes in timed relation with the rotation of the rotor so that the cut-out portion of each vane passes the division plate comprising a vane position control member mounted for rotation on the housing end member adjacent one rotor end member and on an axis that is parallel to the rotor axis but displaced radially therefrom by a predetermined distance, a crank rigidly connected to each of said vane shafts and having an effective length equal to said predetermined distance, said cranks being pivotally connected to spaced points on said control member whereby the orientation of each vane about its axis remains fixed with respect to the housing as the vane axes move with the rotor to follow a circumferential path about the fixed arbor thereby permitting the cut-out portion of the vanes to pass said division plate.

2. The fluid handling device defined in claim 1 wherein each crank is pivotally connected to the control member by a pin fixed to the control member and projecting into an associated opening in the crank.

*3. A fluid handling device of the positive displacement type comprising a body made up of a housing having an inner cylindrical surface therein and opposed rigid end members, a rotor rotatably mounted about an axis in said housing and having an outer cylindrical surface concentric with the inner cylindrical surface of said housing to form an annular fluid displacement chamber, spaced end members fixedly mounted on said rotor within said housing having a running clearance with the body at opposite ends of said displacement chamber, a division plate mounted in said chamber within said housing and having a running clearance with said outer cylindrical surface of said rotor, said division plate providing a continuous cylindrically curved surface extending the entire length of said rotor surface between said rotor end members, means providing fluid inlet and outlet connections in said chamber adjacent opposite sides of said division plate, a plurality of longitudinal surface pockets in said rotor each extending the entire length of said rotor surface between said end members, a longitudinally extending vane shaft for each surface pocket rotatably mounted on the rotor and projecting through one of said rotor end members, a cylindrically shaped vane having a cut-out portion mounted on each of said vane shafts to extend into said pockets, each said vane having its cylindrically curved surface of the same axial length as said division plate surface, means for rotating the vanes in timed relation with the rotation of the rotor so that the cut-out portion of each vane passes the division plate comprising a vane position control member mounted for rotation within said housing on the housing end member adjacent one rotor and member and on an axis that is parallel to the rotor axis but displaced radially therefrom by a predetermined distance, a crank rigidly connected to each of said vane shafts and having an effective length equal to said predetermined distance, said cranks being pivotally connected to spaced points on said control member whereby the orientation of each vane about its axis remains fixed with respect to the housing as the vane axes move with the rotor to follow a circumferential path about the rotor axis.*

*4. The fluid handling device defined in claim 3, wherein each crank is pivotally connected to the control member by a pin fixed to the control member and projecting into an associated opening in the crank.*

*5. A fluid handling device of the positive displacement type comprising a body made up of a housing having an inner cylindrical surface therein and opposed rigid end members, a rotor rotatably mounted about a fixed axis within said housing and having an outer cylindrical surface concentric with the inner cylindrical surface of said housing to form therebetween an annular fluid displacement chamber, spaced end members fixedly mounted on said rotor and each having a running clearance with the body, a fixed division plate mounted in said chamber within said housing and having a running clearance with said rotor and said spaced rotor end members, means providing fluid inlet and outlet connections to said chamber adjacent opposite sides of said division plate, a plurality of longitudinal surface pockets in said rotor extending between said end members, a longitudinally extending vane for each surface pocket rotatably mounted on the rotor and each vane having a shaft fixed thereto and projecting through one of said rotor end members, each vane being cylindrically shaped and having a longitudinal cut-out portion, and means for rotating said vanes in timed relation with the rotation of the rotor so that the cut-out portion of each vane passes said division plate comprising a vane position control member mounted for rotation on the housing end member adjacent said one rotor end member and on an axis that is parallel to the rotor axis but displaced radially therefrom by a predetermined distance, and a crank rigidly connected to each of said vane shafts and having an effective length equal to said predetermined distance, said cranks being pivotally connected to spaced points on said control member whereby the orientation of each vane about its axis remains fixed with respect to the housing as the vane axes move with the rotor to follow a circumferential path about the rotor axis.*

References Cited in the file of this patent or the original patent

UNITED STATES PATENTS

| | | |
|---|---|---|
| 153,202 | Pruett | July 21, 1874 |
| 1,565,401 | Schaeren | Dec. 15, 1925 |
| 1,686,285 | Mason | Oct. 2, 1928 |
| 2,274,206 | Marsh | Feb. 24, 1942 |
| 2,508,356 | Allsup | May 23, 1950 |
| 2,694,983 | Farrell | Nov. 23, 1954 |

FOREIGN PATENTS

| | | |
|---|---|---|
| 141,309 | Austria | Apr. 10, 1935 |
| 448,292 | Germany | Aug. 15, 1927 |
| 480,856 | Great Britain | Feb. 25, 1938 |
| 518,638 | Germany | Feb. 28, 1931 |
| 988,951 | France | May 16, 1951 |